(12) United States Patent
Luss

(10) Patent No.: US 7,477,607 B2
(45) Date of Patent: Jan. 13, 2009

(54) METHOD FOR ALLOCATING BLOCKS OF INTERNET PROTOCOL (IP) ADDRESSES IN NETWORKS

(75) Inventor: Hanan Luss, Marlboro, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 701 days.

(21) Appl. No.: 11/158,752

(22) Filed: Jun. 22, 2005

(65) Prior Publication Data

US 2006/0092936 A1 May 4, 2006

Related U.S. Application Data

(60) Provisional application No. 60/623,808, filed on Oct. 29, 2004.

(51) Int. Cl.
*H04L 12/26* (2006.01)
*H04L 12/56* (2006.01)
*H04J 3/16* (2006.01)

(52) U.S. Cl. .................... 370/238; 370/395.52; 370/468

(58) Field of Classification Search .................. 370/468, 370/395.4, 395.52, 395.41, 238, 230.1, 254
See application file for complete search history.

(56) References Cited

OTHER PUBLICATIONS

K. Washburn et al, "TCP/IP Running a Successful Network", Addison Wesley Longman, Second Edition, 1996, Chapter 3, pp. 41-61.
E. G. Coffman et al, "Bin Packing with Divisible Item Sizes", Journal of Complexity, vol. 3, pp. 406-428, 1987.

*Primary Examiner*—Chirag G Shah
*Assistant Examiner*—Srinivasa R Reddivalam
(74) *Attorney, Agent, or Firm*—Philip J. Feig; Joseph Giordano

(57) ABSTRACT

Methods for allocating blocks of addresses to nodes in an IP communications network determine an optimal set of serving subnets, referred to as resources, for a single node in an IP communications network with given input demands for blocks of addresses. An optimal set of resources is determined at the node to a relaxed problem that aggregates all the demands to a single large demand and deletes the constraints that each demand must be assigned to a single resource. Each of the original demands is then assigned to a single resource from among those determined by the solution to the relaxed problem. The methods can also be used to allocate new resources to nodes that already have existing resources, and to allocate subnets at all nodes in a tree network by solving repeatedly single-node problems.

14 Claims, 2 Drawing Sheets

METHOD FOR ALLOCATING BLOCKS OF INTERNET PROTOCOL (IP) ADDRESSES IN NETWORKS

CROSS-REFERENCE TO RELATED APPLICATIONS

This application claims the benefit of the filing date of U.S. Provisional Patent Application No. 60/623,808, filed Oct. 29, 2004, the disclosure of which is hereby incorporated herein by reference.

FIELD OF THE INVENTION

The present invention relates to internet protocol (IP) communications networks. More particularly, the invention relates to methods for allocating blocks of addresses to nodes in an IP communications network.

BACKGROUND OF THE INVENTION

Internet Protocol (IP) communications networks have become critically important for voice, data and video communications. As a result, these networks are rapidly growing in size and complexity. IP communications networks route packets of information from sources to destinations using routing tables that include IP addresses. One or more blocks of IP addresses are allocated to a node. Each block of addresses comprises consecutive numbers. A block of addresses is called a subnet. Due to the significant increase in IP services, IP addresses are now recognized as a critical resource. While service providers must maintain a high utilization of their IP address pool, they also desire to limit the number of subnets at a node, since excessive fragmentation of addresses at a node leads to inefficient traffic routing. Telecommunications service providers, software providers, and equipment manufacturers have realized the need for software systems that effectively manage IP addresses using automated systems. However, current state-of-the-art systems use ad-hoc heuristic methods and IP communications network managers' experience for the allocation of subnets among the nodes in the network. Optimization-based models for the optimal allocation of subnets at every node of an IP communications network would significantly enhance such automated systems. Many IP text books provide background material on the planning and management of IP addresses. For example, K. Washburn and J. Evans provide such background in Chapter 3 of their book *TCP/IP: Running a Successful Network*, Addison-Wesley, Second Edition, 1996, which is incorporated herein by reference.

SUMMARY OF THE INVENTION

The present invention provides methods for the optimal allocation of blocks of addresses, called subnets, in IP communications networks. Consider a single node in an IP communications network. This node may have to accommodate multiple demands. Each of these demands is a block of IP addresses whose size is a power-of-two integer. A demand may be a subnet allocated to a node at a lower level in the network or an external demand for addresses at the node. These demands are assigned to serving subnets at the node, also referred to as resources. Each resource is a power-of-two integer. The objective of the assignment is to select a set of resources that balances the amount of excess addresses that are not used at the resources with the fragmentation of addresses at the node to too many resources with a discontinuous range of addresses. To achieve this goal, a cost function is assigned to each resource that increases with the subnet size, but exhibits economies-of-scale savings. The maximal number of resources allowed at a node is restricted to a specified parameter. The methods described below find an optimal set of resources at the node. An optimal set implies that there is no other feasible set of resources with a lower combined cost of resources in the set than the set provided by the solution.

To that end, first a method is developed that provides an optimal solution to a relaxed problem, where all the demands are aggregated to a single demand, while deleting the constraints that each demand is assigned to a single resource. There are two methods that determine an optimal set of resources for the relaxed problem. Then a further method is provided that takes the original demands and assigns each of them to a single resource that is in the solution of the relaxed problem. Again, this latter method takes advantage of the fact that all resources and demands are power-of-two integers. Thus, the optimal set of resources for the relaxed problem and the demand assignments that follow constitute an optimal solution to the original problem where each demand must be assigned to a single resource.

The methods described above can also be used for allocating new serving subnets to nodes that already have existing serving subnets. Through the repeated application of the methods, it is possible to evaluate the desirability of returning existing subnets to a pool of addresses in order to gain more flexibility in allocating new serving subnets to the node.

The methods described above can also be used to allocate resources to all nodes in a tree network. Starting at the nodes at the lowest level of the network, a single-node problem is solved for each of the nodes at that level. The resulting resources constitute demands to the nodes at the next level. Then a single-node problem is solved for each node at that level. The process proceeds in this way to solve single-node problems at each level, where the resources from one level become demands for the next level. Each node may also have external demands. The process terminates once the single-node problem at the root node has been solved.

The present invention will be more clearly understood when the following description is read in conjunction with the accompanying drawings.

DETAILED DESCRIPTION

Figure 1:
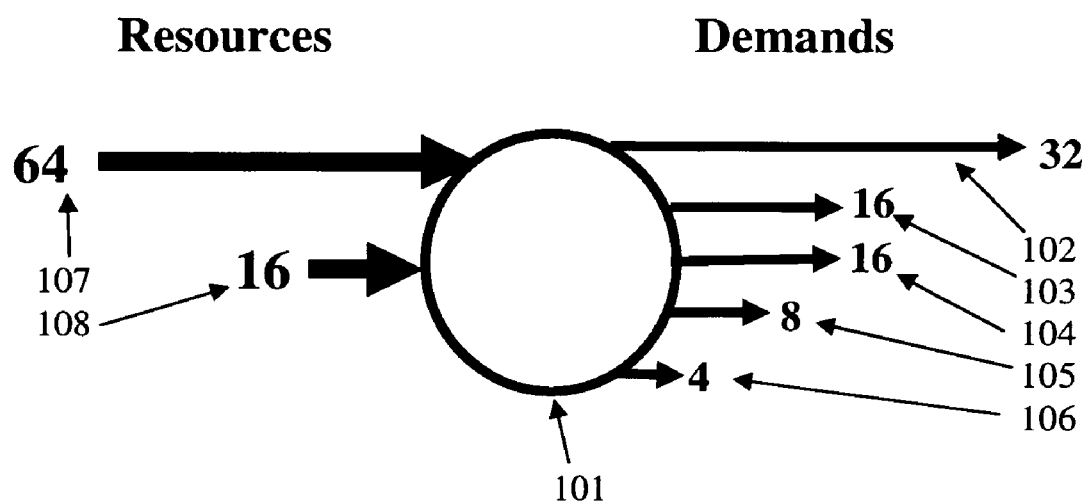
FIG. 1 shows the single-node problem, where an optimal set of resources is determined to serve demands.

Referring now to the figures and to FIG. 1 in particular, there is shown an example of a single node 101 in an IP communications network. The demands 102-106 imposed on the node are subnets or external demands, where each demand comprises a block of IP addresses. Thus, demand 102 is a block of 32 IP addresses, demand 103 is a block of 16 addresses, etc. The size of a demand is always a power-of-two integer (i.e., 1, 2, 4, 8, ... ). The demands 102-106 imposed on the node must be assigned to serving subnets, referred to as resources. In FIG. 1, resource 107 is of size 64 and resource 108 is of size 16. A resource must also be of a size that is a power-of-two integer. Each of the demands 102-106 must be assigned to a single resource. For example, demands 102, 103 and 104 may be assigned to resource 107, and demands 105 and 106 may be assigned to resource 108.

The goal is to determine a set of resources that attempts to balance the volume of excess addresses that are not used with fragmentation of addresses at nodes to too many resources with a discontinuous range of addresses. Current state-of-the-art assignment methods employed by IP communications network planners use ad-hoc methods comprising simple heuristic rules and IP communications network managers' experience. E. G. Coffman, M. R. Garey, and D. S. Johnson present in their paper "Bin Packing with Divisible Item Sizes", *Journal of Complexity*, Volume 3, pages 406-428, 1987 a method for blocks with divisible sizes. Their method is not appropriate for IP address allocations since it does not take advantage of the power-of-two sizes, and would only minimize the volume of excess addresses at the expense of incurring significant fragmentation to too many resources with a discontinuous range of addresses.

The present method assigns a cost to a resource that while increasing with its size, it exhibits economies-of-scale savings. This means that the cost per address decreases (or, at worst, does not increase) with the resource size. This implies that there will not be employed multiple resources of the same size at a node. Taking advantage that demands and resources are power-of-two integers, methods are provided that find an optimal set of resources at a node. This means that there does not exist any other set of resources whose cost is less than that provided by the present method.

Now, formulate the model described in FIG. 1 as follows:

k=Index for resources; k=1, 2, . . . , K, where K is the number of available resources of different size (number of addresses).

$C_k$=Size of resource k; $C_{k+1}>C_k$ for k=1, 2, . . . , K−1. The size of resource k is $C_k=2^{k-1}C$ for k=1, 2, . . . , K, where $C_1=C$ (the smallest resource size) is a power-of-two integer.

$V_k$=Cost of resource k; $V_{k+1}>V_k$ and $V_{k+1}/C_{k+1} \leq V_k/C_k$ for k=1, 2, . . . , K−1.

N=The maximal number of resources that can be allocated.

r=Index for demands that need to be assigned to resources; r=1, 2, . . . , R, where R is the number of different demands that need to be assigned.

$D_r$=The size of the r-th demand that needs to be assigned; $D_{r+1} \geq D_r$, r=1, 2, . . . , R, and all demands are power-of-two integers.

D=Sum of all the demands; $D=\Sigma_{r=1}^{R}D_r$. The largest resource K is of size $C_K \geq D$ while $C_{K-1}<D$.

$x_k$=Decision variable, where $x_k=1$ if resource k is allocated to serve demands at the node and $x_k=0$ otherwise.

$y_{rk}$=Decision variable, where $y_{rk}=1$ if demand r is assigned to resource k and $y_{rk}=0$ otherwise.

Examples of cost functions for resources with smaller cost per address when the resource size is larger may include, but are not limited to, $V_k=A+BC_k$ or $V_k=A+B\lg(C_k)$ (A, B>0). Such cost functions are appropriate for IP subnet allocation because they facilitate balancing the cost of allocating too many addresses that are not used at a node versus the cost of allocating too many resources with discontinuous ranges of addresses.

The resource allocation problem [Problem (1)] is formulated as follows:

$$\text{Minimize} \sum_{k=1}^{K} V_k x_k \text{ so that} \quad (1.1)$$

$$\sum_{r=1}^{R} D_r y_{rk} \leq C_k x_k, k = 1, 2, \ldots, K \quad (1.2)$$

$$\sum_{k=1}^{K} y_{rk} = 1, \quad r = 1, 2, \ldots, R \quad (1.3)$$

-continued $$\sum_{k=1}^{K} x_k \leq N, \quad (1.4)$$

$$x_k = 0, 1, \quad k = 1, 2, \ldots, K \quad (1.5)$$

$$y_{rk} = 0, 1, \quad r = 1, 2, \ldots, R \text{ and } k = 1, 2, \ldots, K. \quad (1.6)$$

Objective function (1.1) minimizes the cost of selected resources. Constraints (1.5) and (1.6) define the decision variables. Constraint (1.2) ensures that demands are assigned only to selected resources and that the demands assigned to any resource k do not exceed the size of resource k. Constraints (1.3) and (1.5) ensure that each of the R demands is assigned to a single resource. Constraint (1.4) ensures that the number of selected resources does not exceed N. Problem (1) can be readily extended by adding a demand whose size is not a power-of-two integer, as long as this demand can be partitioned into pieces which can be assigned to different resources. As will be described later, the solution methods will readily handle this additional case.

The method will first solve a relaxed version of Problem (1), formulated by aggregating constraints (1.2) and (1.3) to a single constraint. In other words, aggregate all the R demands to a single demand of size D, while deleting the constraints that each demand is assigned to a single resource. Once an optimal solution is found to the relaxed problem [Problem (2)], a method is provided that assigns each of the demands to a single resource from among those determined by the solution to Problem (2), thus providing an optimal solution to Problem (1).

Problem (2) is formulated as follows:

$$\text{Minimize} \sum_{k=1}^{K} V_k x_k \text{ so that} \quad (2.1)$$

$$\sum_{k=1}^{K} C_k x_x \geq D, \quad (2.2)$$

$$\sum_{k=1}^{K} x_k \leq N, \quad (2.3)$$

$$x_k = 0, 1, \quad k = 1, 2, \ldots, K. \quad (2.4)$$

Since $C_K \geq D$, Problem (2) has a feasible solution and constraint (2.2) ensures that the sum of selected resource sizes is at least as large as the aggregated demand. Constraint (2.3) ensures that the number of selected resources does not exceed N.

To find an optimal solution to Problem (1) D is rounded up to an integer multiple of C. It is possible (but not necessary) to normalize the demand and resource sizes to units of C. Hence, hereinafter, assume that D has been rounded up, and all resource capacities $C_k$ and the demand D are expressed in units of C. For example, suppose $D_1=2, D_2=8, D_3=16$ (R=3) and C=4. Then D=2+8+16=26 and is thus rounded up to 28. Suppose the possible resource sizes are $C_1=4, C_2=8, C_3=16$, and $C_4=32$. Expressing the resource sizes and the demand in units of C, we get $C_1=1, C_2=2, C_3=4$, and $C_4=8$, and D=7.

Let $S_n(D)$ be a set of n resources of different sizes such that the sum of the sizes of these n resources, denoted as $C[(S_n(D)]$, satisfies $C[(S_n(D)] \geq D$. Let $V[(S_n(D)]$ be the sum of costs of the n resources in $S_n(D)$.

A key definition is that $S_n(D)$ is an (n, D)-dominating set for demand D if and only if $C[(S_n(D)] < C[(S'_m(D)]$ for any set $S'_m(D)$ with $m \leq n$.

Since any resource can be selected at most once and the resource sizes are power-of-two integers, there is at most one (n, D)-dominating set for any given n. The set $S_1(D) = \{K\}$ is the (1, D)-dominating set. There exists an optimal solution to Problem (2) that is an (n, D)-dominating sets for some $n \leq N$.

Method I

The following is a method for determining an optimal set of resources for Problem (2) [this set of resources is also optimal for Problem (1)]

Step 1: Initialization.
  (a) Find the smallest K such that $C_K \geq D$. Specifically, find K that satisfies $2^{K-2} < D \leq 2^{K-1}$.
  (b) Record available resources k=1, 2, ..., K with sizes $C_k = 2^{k-1}$ for k=1, 2, ..., K.
  (c) Set $k_1 = K$. Initialize a list, referred to as LIST, of dominating sets with set $S_1(D) = \{k_1\}$ (this is the (1, D)-dominating set). Set n=1.

Step 2: Find an optimal solution.
  (a) If n=N or if $C[S_n(D)] = D$ for $S_n(D) \in$ LIST, compute cost $V[S_m(D)]$ for each (m, D)-dominating set $S_m(D) \in$ LIST (each m is an index from among 1, 2, ..., n). Select the minimum cost (m, D)-dominating set as an optimal solution to problem (2). STOP.
  (b) If n<N and $S_n(D) \in$ LIST, go to Step 3.
  (c) If n<N and $S_n(D) \notin$ LIST, go to Step 4.

Step 3: Find the (n+1, D)-dominating set $S_{n+1}(D)$, given that $S_n(D) = \{k_1, k_2, \ldots, k_n\} \in$ LIST.
  (a) Compute $\delta = D - [C[S_n(D)] - C_{k_n} + C_{k_n - 1}]$.
  (b) Find the smallest resource k' such that $\delta \leq C_{k'} < C_{k_n - 1}$. If it exists, add $S_{n+1}(D) = \{S_n(D) - k_n + (k_n - 1) + k'\}$ to LIST.
  (c) Update $n \leftarrow n+1$ and go to Step 2.

Step 4: Find the (n+1, D)-dominating set $S_{n+1}(D)$, given that the last added set to LIST is $S_q = \{k_1, k_2, \ldots, k_q\}$ for some q<n.
  (a) Compute $\delta = D - [C[S_q(D)] - C_{k_q} + C_{k_q - 1} + C_{k_q - 2} + \ldots + C_{k_q - (n-q+1)}]$.
  (b) Find the smallest resource k' such that $\delta \leq C_{k'} < C_{k_q - (n-q+1)}$. If it exists, add $S_{n+1}(D) = \{S_q(D) - k_q + (k_q - 1) + \ldots + [(k_q - (n-q+1)] + k'\}$ to LIST.
  (c) Update $n \leftarrow n+1$ and go to Step 2.

The method is illustrated through two examples. Suppose D=37 (in units of C) and N=3. The largest resource that needs to be considered is of size 64, thus, K=7. Hence, the resources under consideration are of sizes (in units of C) $C_1=1$, $C_2=2$, $C_3=4$, $C_4=8$, $C_5=16$, $C_6=32$, and $C_7=64$. Attempt to find the (n, 37)-dominating sets for n=1, 2 and 3. From Step 1, $S_1(37) = \{7\}$, with size $C_7=64$, is the (1, 37)-dominating set. From Step 3, $\delta = 37 - [64 - 64 + 32] = 5$, implying k'=4 with size $C_4=8$. Hence, $S_2(37) = \{6, 4\}$, with a combined size of $C_6 + C_4 = 32 + 8 = 40$, is the (2, 37)-dominating set. Executing again Step 3, $\delta = 37 - [40 - 8 + 4] = 1$, implying k'=1 with size $C_1 = 1$. Hence, $S_3(37) = \{6, 3, 1\}$, with a combined size of $C_6 + C_3 + C_1 = 32 + 4 + 1 = 37$, is the (3, 37)-dominating set. Suppose the cost of resource k is $V_k = 4 + C_k$, for all k, where $C_k$ is expressed in units of C. Then, the costs of the (n, 37) dominating sets are: $V[S_1(37)] = 4 + 64 = 68$, $V[S_2(37)] = 2*4 + 40 = 48$, and $V[S_3(37)] = 3*4 + 37 = 49$. Hence, $S_2(37) = \{6, 4\}$ is optimal for problem (2) with a combined size of 32+8=40 and at a cost of 48.

Now solve the same example for a demand D=55. Again, $S_1(55) = \{7\}$ is the (1, 55)-dominating set. However, in the second iteration, from Step 3, $\delta = 55 - [64 - 64 + 32] = 23$, and there is no k' that satisfies $23 \leq C_{k'} < 32$. Thus, a (2, 55)-dominating set does not exist. This can readily be verified as follows. The (2, 55)-dominating set cannot include resource 7 with size 64, and the next two largest resources have a combined size of 32+16=48<55, which is not large enough. Proceed to find the (3, 55)-dominating set and execute Step 4. Since q=1, $\delta = 55 - [64 - 64 + 32 + 16] = 7$, implying that k'=4 with size 8. Hence, $S_3(55) = \{6, 5, 4\}$, with a combined size of 32+16+8=56, is the (3, 55)-dominating set. The costs of the dominating sets are: $V[S_1(55)] = 4 + 64 = 68$ and $V[S_3(55)] = 3*4 + 56 = 68$. Hence, both dominating sets are optimal at a cost of 68.

A second method is provided that solves Problem (2) for all demand values in the range $0 < D \leq D_{max}$, where $D_{max}$ and the resource sizes are expressed in units of C. Since it is possible to specify a $D_{max}$ value that is a power-of-two integer, the resources of interest are therefore limited to resources k with sizes $2^{k-1}$ for k=1, 2, ..., K, where $C_K = D_{max}$. Construct all possible sets of resources, where each set has at most N resources with a combined size that does not exceed $D_{max}$. Let S(i) be the i-th largest set with combined size C[S(i)]. Obviously, $S(1) = \{K\}$. Call S(i) the minimal set for demand D in the range $C[S(i+1)] < D \leq C[S(i)]$, since S(i) is the set with the smallest combined size that can handle any demand in this range.

Let the binary vector B(i) be of dimension K. Then, the ordered list of S(i)'s is derived by selecting values of B(i) in decreasing order, where the number of 1's in B(i) is up to N. Each 1 in B(i) represents a resource, where the left most position represents resource K, the next position represents resource K-1, and so forth. For example, let K=4 and N=2. B(1)=(1000) implies S(1)={4} with size $2^3 = 8$, B(2)=(0110) implies S(2)={3, 2} with a combined size of 4+2=6, B(3)=(0101) implies S(3)={3, 1} with a combined size of 4+1=5, B(4)=(0100) implies S(4)={3} with size 4, B(5)=(0011) implies S(5)={2, 1} with a combined size of 2+1=3, B(6)=(0010) implies S(6)={2} with size 2, and B(7)=(0001) implies S(7)={1} with size 1. Thus, S(1) is minimal for demand values 7 and 8, S(2) is minimal for demand value 6, and so forth.

Now, it is possible to compute the cost V[S(i)] of each minimal set. Consider minimal sets S(i) and S(j) for some i<j. If $V[S(j)] \geq V[S(i)]$, then S(j) can be deleted from the list since it has a smaller combined size than S(i) and costs at least as much. Once all such S(j) are deleted, each of the remaining sets is optimal for some values of D. Suppose $S(i_1)$ and $S(i_2)$ are two minimal sets that remain in the ordered list with $i_1 < i_2$, while all sets S(i), for $i = i_1 + 1, \ldots, i_2 - 1$, were deleted. Then, $S(i_1)$ is an optimal solution for Problem (2) for all demands in the range $C[S(i_2)] < D \leq C[S(i_1)]$.

Method II

A method for determining optimal sets of resources for Problem (2) for all demand values in the range $0 < D \leq D_{max}$, where $D_{max}$ is a power-of-two integer [these sets of resources are also optimal for Problem (1)].

Step 1: Initialization.
  (a) Find K such that $C_K = 2^{K-1} = D_{max}$.
  (b) Record available resources k=1, 2, ..., K with sizes $C_k = 2^{k-1}$ for k=1, 2, ..., K.

Step 2: Find all minimal sets.
  (a) Construct an ordered list of all NSETS minimal sets S(i), where S(1)={K}, C[S(i)]>C[S(i+1)] for i=1, 2, ..., NSETS-1, and the number of resources in a set does not exceed N.
  (b) Determine the values of D for which each S(i) is the minimal set. Specifically, if C[S(i)] and C[S(i+1)] are the sizes of sets i and i+1, then S(i) is the minimal set for the D values in the range C[S(i+1)]<D≦C[S(i)]. (Step 2(b) is provided for expository purposes only. It may be omitted.)

Step 3: Find optimal solutions.
  (a) Compute the cost V[S(i)] of minimal set S(i) for each i=1, 2, . . . , NSETS.
  (b) Delete any minimal set S(j) with a combined size of C[S(j)] and cost V[S(j)] if there is a minimal set S(i), i<j with cost V[S(i)])≦V[S(j)].
  (c) Suppose S($i_1$) and S($i_2$) are two sets that remained in the list with $i_1$<$i_2$, while all sets S(i), for i=$i_1$+1, . . . , $i_2$−1, were deleted. Then, S($i_1$) is an optimal solution for Problem (2) in the demand range C[S($i_2$)]<D≦C[S($i_1$)]. Record the values D for which each minimal set that remained on the list is optimal. STOP.

Next is an example with $D_{max}$=32, N=3. The largest resource needed is K=6 with size 32. Assume that the resource costs are $V_k$=3+$C_k$, k=1, 2, . . . , 6 (where $C_k$ is in units of C). For this example, there are 26 minimal sets, where B(1)=(100000) and B(26)=(000001). The results for the largest 8 sets are shown in Table 1.

TABLE 1

| i | B(i) | S(i) | C[S(i)] | Minimal for D | V[S(i)] | Delete | Optimal for D |
|---|------|------|---------|---------------|---------|--------|---------------|
| 1 | (100000) | {6} | 32 | 29-32 | 35 | | 26-32 |
| 2 | (011100) | {5, 4, 3} | 16 + 8 + 4 = 28 | 27-28 | 37 | delete | |
| 3 | (011010) | {5, 4, 2} | 16 + 8 + 2 = 26 | 26 | 35 | delete | |
| 4 | (011001) | (5, 4, 1) | 16 + 8 + 1 = 25 | 25 | 34 | | 25 |
| 5 | (011000) | {5, 4} | 16 + 8 = 24 | 23-24 | 30 | | 21-24 |
| 6 | (010110) | {5, 3, 2} | 16 + 4 + 2 = 22 | 22 | 31 | delete | |
| 7 | (010101) | {5, 3, 1} | 16 + 4 + 1 = 21 | 21 | 30 | delete | |
| 8 | (010100) | {5, 3} | 16 + 4 = 20 | 20 | 26 | | 19-20 |

The columns i, B(i), S(i), C[S(i)], Minimal for D, and V[S(i)] are self-explanatory. Consider the second row with i=2. It includes the set S(2)={5, 4, 3} which has the largest possible size (C[S(2)]=28) below that of the set S(1)={6} with capacity 32. Thus, S(1) is the minimal set for 28<D≦32. The cost of S(2) is its capacity plus 3×3, namely, 37. All 26 sets are minimal sets, however, due to their cost, some can be deleted. For example, minimal sets S(2) and S(3) are deleted since their costs are at least 35—the cost of minimal set S(1). The last column provides the values of D for which the remaining minimal sets are optimal. For example, set S(1)={6} is optimal for demands 26-32 and set S(5)=(5, 4) is optimal for demands 21-24.

Consider an optimal solution to Problem (2), with M selected resources M≦N. This solution is obtained by using Method I or Method II. Let SUPPLY={$k_1, k_2, \ldots, k_M$} be the set of the M selected resources ($k_1$>$k_2$>...>$k_M$) that provides an optimal solution to Problem (2). The sizes of these resources satisfy $C_{k_m}$>$C_{k_{m+1}}$ for m=1, 2, . . . , M−1. Let DEMAND={1, 2, . . . , R} be the set of demands in Problem (1), where $D_{r+1}$≧$D_r$ for r=1, 2, . . . , R−1. Presented below is Method Assign that assigns each of the demands in DEMAND to a single resource in SUPPLY. Hence, by applying Method Assign to an optimal set SUPPLY for problem (2), there is a feasible and optimal solution to Problem (1).

Method Assign

While set DEMAND is not empty,
  Select the largest demand in DEMAND, say demand r of size $D_r$.
  Assign demand r to the resource in SUPPLY, say resource $k_m$, with the least capacity $C_{k_m}$ such that $C_{k_m}$≧$D_r$.
  Delete demand r from DEMAND.
  If $C_{k_m}$=$D_r$, delete resource $k_m$ from SUPPLY. If $C_{k_m}$>$D_r$, update $C_{k_m}$←$C_{k_m}$−$D_r$.
End.

An example of Method Assign is as follows: Suppose the demands are: $D_1$=2, $D_2$=4, $D_3$=8, $D_4$=8, $D_5$=16, $D_6$=16, and $D_7$=16, implying D=70, and suppose the solution to problem (2) has SUPPLY={4, 1} with sizes $C_4$=64 and $C_1$=8. Note that these demand and resource sizes are not translated to units of C=8. Although not done here, it is possible to express all demand and resource sizes in Method Assign in units of $D_1$. Method Assign assigns demands as follows:

Demand 7 with $D_7$=16 is assigned to resource 4 whose size is 64. The resource size is updated to 48.

Demand 6 with $D_6$=16 is assigned to resource 4 whose updated size is 48. The resource size is again updated to 32.

Demand 5 with $D_5$=16 is assigned to resource 4 whose updated size is 32. The resource size is again updated to 16.

Demand 4 with $D_4$=8 is assigned to resource 1 whose size is 8. Resource 1 is deleted.

Demands $D_3$=8, $D_2$=4, and $D_1$=2 are assigned to resource 4.

Upon termination, resource 1 is fully used and resource 4 has 2 units of excess capacity remaining unused.

A node may also have an external demand that is not a power-of-two integer, as long as it is allowed to partition this demand into pieces that will be assigned to different resources. Apply Method I (or Method II) to solve Problem 2 where D also includes this external demand. Then, apply Method Assign to assign each of the demands in DEMAND (which does not include this external demand) to a single resource. Once this is completed, partition the remaining external demand to pieces that would fit into the resources.

Method for Determining Optimal Mix of Existing and New Serving Subnets

Suppose there are P≦N existing resources. Assign a gain of $G_p$ for returning resource p, p=1, 2, . . . , P to a pool of resources. The gain from returning resource p will typically be smaller than the cost of a new resource of the same size, since it may be difficult to allocate the returned resource to a different node effectively. The gain may even be zero or negative due to expected service disruptions. If P is small, it is possible to enumerate all possible combinations of resource returns and solve Problem (1) for each of these combinations, where the number of new plus unreturned resources is not allowed to exceed N. The existing demands assigned to resources that were returned would then be handled as new demands. Alternatively, it is possible to solve Problem (1) for only some of these combinations at the risk of missing the best one. It may be reasonable to use only P combinations of returns, comprising returning the smallest existing resource, the two smallest existing resources, and so forth, up to all P existing resources. Again, for each of these combinations we solve Problem (1), where the number of existing plus new resources cannot exceed N. Then select the minimum-cost solution from among all those that were solved.

The Network Problem

Figure 2:
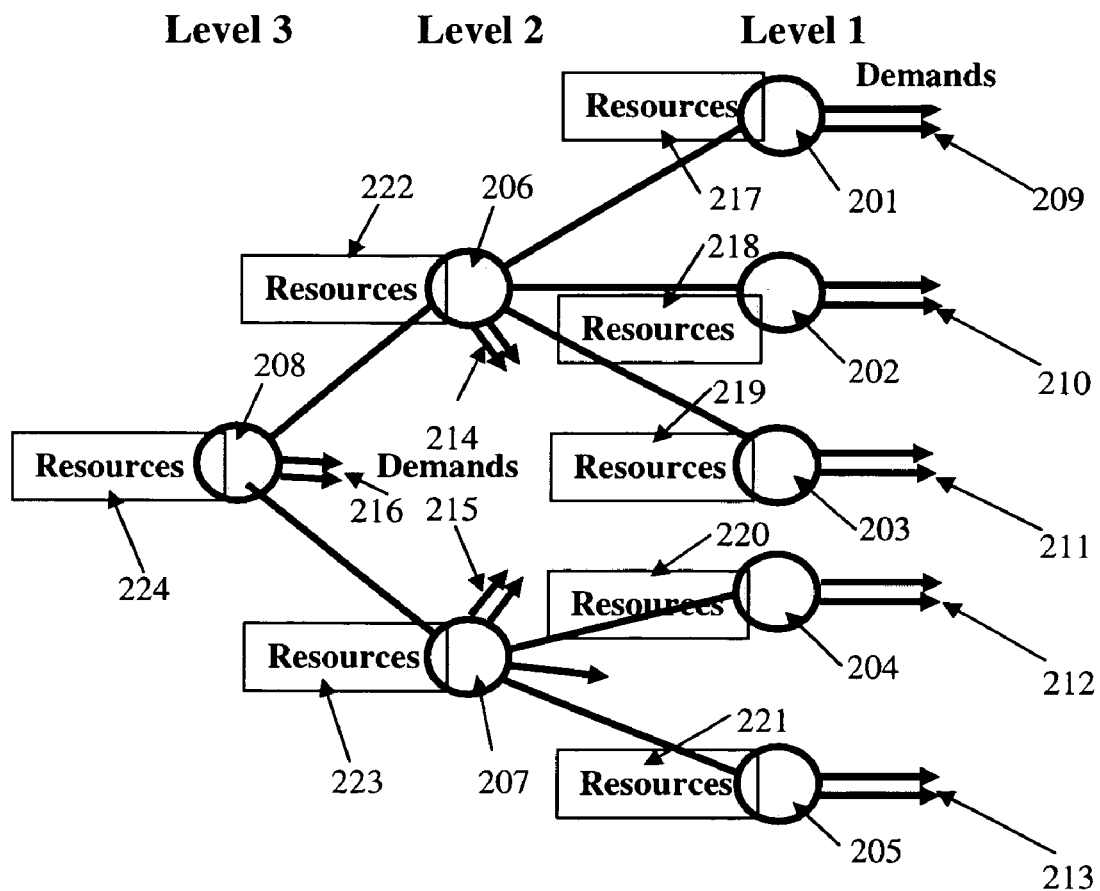
FIG. 2 shows the network problem where resources associated with nodes at one level become demands for nodes at a higher level.

The solutions to single-node problems are used to solve a network problem that has a tree structure like that shown in FIG. 2. IP communications networks typically consist of multiple tree networks, interconnected through a backbone network that connects the root nodes of the tree networks. FIG. 2 depicts an example of a tree network problem, where resources associated with nodes at one level become demands for nodes at the next level. Level 1 includes nodes 201-205. Each of these nodes serves blocks of demands, where each demand block is a power-of-two integer. It may also serve a demand that is not a power-of-two integer as long as that demand can be split and assigned to more than one resource. In the example shown in FIG. 2, node 201 serves demands 209, node 202 serves demands 210, node 203 serves demands 211, node 204 serves demands 212, and node 205 serves demands 213. Apply at each of these nodes Method I or Method II, followed by Method Assign, to determine an optimal set of resources and to assign the demands to resources. These sets of resources are marked as 217 for node 201, 218 for node 202, 219 for node 203, 220 for node 204, and 221 for node 205. Consider now node 206. Resources 217, 218 and 219 that were determined while solving the single-node problems at level 1 become demands to node 206. Node 206 also may have external demands 214. Now find an optimal set of resources 222 at node 206. The optimal set of resources and assignment of demands to resources is again determined by applying Method 1 (or Method 2), followed by Method Assign. Similarly, solve the single-node problem at node 207. Resources 220 and 221 become demands for node 207. Node 207 must also serve demands 215. Now that the two nodes at level 2 are solved, proceed to level 3, which as shown in the example in FIG. 2 has only node 208. This node must serve resources 222 and 223, as well as demands 216. An optimal set of resources 224 and assignment of demands to resources is determined at node 208 by using again Method 1 (or Method 2), followed by Method Assign.

While there have been described and illustrated methods for allocating blocks of internet protocol addresses in networks, it will be apparent to those skilled in the art that modifications and variations are possible without deviating from the teachings and broad principles of the present invention which shall be limited solely by the scope of the claims appended hereto.

What is claimed is:

1. A method for determining optimal number and sizes of resources to serve multiple demands where each of the demands is assigned to a single resource, wherein resource sizes and demand sizes are limited to power-of-two integers, the larger the resource size the higher its cost but the cost per size unit does not increase with the resource size, and the maximal number of allowed resources is limited to a specified parameter, where resources are subnets in a node of the Internet Protocol (IP) communications network that serve demands for blocks of addresses and demands are either subnets from other nodes in the Internet Protocol (IP) communications network or external demands, comprising the steps of:

(a) finding an optimal solution to a relaxed problem wherein all demands are aggregated to a single demand and the constraints that each demand is assigned to a single resource are deleted by determining all dominating sets with a number of resources that does not exceed the maximal number of allowed resources and with a combined resource capacity that is equal to or larger than the aggregated demand, where a set of resources that can serve the aggregated demand dominates all other sets of resources with equal or less number of resources that can serve same aggregated demand if the sum of capacities of the former set is smaller than the sum of capacities of the latter sets, and selecting the minimum-cost dominating set as an optimal set of resources for the specified aggregated demand; and (b) taking the resource sizes of the optimal solution to the relaxed problem and assigning one at a time the largest unassigned demand into the resource whose remaining unused capacity is the smallest among all resources but at least as large as the demand.

2. The method as set forth in claim 1, wherein there are already existing resources and the number of existing resources plus new resources does not exceed the specified parameter, assigning gain or loss to a returned resource to a pool of resources and repeatedly performing steps (a) and (b) where the number of the unreturned resources plus new resources does not exceed the specified parameter and selecting the minimum-cost solution.

3. The method as set forth in claim 1 wherein the communications network is in the form of a tree topology and determining optimal number and sizes of subnets at each node of the tree topology communications network by performing steps (a) and (b) at each node of the tree network, starting at each node of the lowest level, then proceeding to each node of the next level, until the node at the top level of the tree topology.

4. The method as set forth in claim 3, wherein the demands at each node of the subnets are determined by the demand of the nodes of the next lower level in the tree topology that are assigned to that node plus external demand at that node.

5. The method as set forth in claim 3, wherein determining the optimal number and sizes of resources is determined at each node of every tree that is part of the communications network.

6. The method as set forth in claim 1, wherein a demand is a demand that is not a power-of-two integer and the demand is assigned to multiple resources.

7. A method for determining optimal number and sizes of resources to serve multiple demands where each of the demands is assigned to a single resource, wherein resource sizes and demand sizes are limited to power-of-two integers, the larger the resource size the higher its cost but the cost per size unit is decreasing or not increasing with the resource size, and the maximal number of allowed resources is limited to a specified parameter, where resources are subnets in a node of the Internet Protocol (IP) communications network that serve demands for blocks of addresses and demands are either subnets from other nodes in the Internet Protocol (IP) communications network or external demands, comprising the steps of:

(a) finding an optimal solution to a relaxed problem wherein all demands are aggregated to a single demand and the constraints that each demand is assigned to a single resource are deleted by determining optimal sets of resources over the entire range of possible demands by determining minimal sets of resources over ranges of possible demands with a number of resources in a set that does not exceed the maximal number of allowed resources, where a set of resources that can serve a range of aggregated demand is minimal if there is no other set with less combined capacity that can serve the demands in that range, and selecting from among the minimal sets the set that is optimal for any specified aggregated demand; and (b) taking the resource sizes of the optimal solution to said relaxed problem and assigning one at a time the largest unassigned demand into the resource whose remaining unused capacity is the smallest among all resources but at least as large as said demand.

8. The method as set forth in claim 7, wherein there are already existing resources and the number of existing resources plus new resources does not exceed the specified parameter, assigning gain or loss to a returned resource to a pool of resources and repeatedly performing steps (a) and (b) where the number of the unreturned resources plus new resources does not exceed the specified parameter and selecting the minimum-cost solution.

9. The method as set forth in claim 7, wherein the communications network is in the form of a tree topology and determining optimal number and sizes of subnets at each node of the tree topology communications network by performing steps (a) and (b) at each node of the tree network, starting at each node of the lowest level, then proceeding to each node of the next level, until the node at the top level of the tree topology.

10. The method as set forth in claim 9, wherein the demands at each node of the subnets is determined by the demand of the nodes of the next lower level in the tree topology that are assigned to that node plus external demand at that node.

11. The method as set forth in claim 9, wherein determining the optimal number and sizes of resources is determined at each node of every tree that is part of the communications network.

12. The method as set forth in claim 7, wherein a demand is a demand that is not a power-of-two integer and the demand is assigned to multiple resources.

13. A program storage device, readable by machine, tangibly embodying a program of instructions executable by the machine to cause the machine to perform a method for determining optimal number and sizes of resources to serve multiple demands where each of the demands is assigned to a single resource, wherein resource sizes and demand sizes are limited to power-of-two integers, the larger the resource size the higher its cost but the cost per size unit does not increase with the resource size, and the maximal number of allowed resources is limited to a specified parameter, where resources are subnets in a node of the Internet Protocol (IP) communications network that serve demands for blocks of addresses and demands are either subnets from other nodes in the Internet Protocol (IP) communications network or external demands, the method comprising the steps of:

(a) finding an optimal solution to a relaxed problem wherein all demands are aggregated to a single demand and the constraints that each demand is assigned to a single resource are deleted by determining all dominating sets with a number of resources that does not exceed the maximal number of allowed resources and with a combined resource capacity that is equal to or larger than the aggregated demand, where a set of resources that can serve the aggregated demand dominates all other sets of resources with equal or less number of resources that can serve same aggregated demand if the sum of capacities of the former set is smaller than the sum of capacities of the latter sets, and selecting the minimum-cost dominating set as an optimal set of resources for the specified aggregated demand; and (b) taking the resource sizes of the optimal solution to the relaxed problem and assigning one at a time the largest unassigned demand into the resource whose remaining unused capacity is the smallest among all resources but at least as large as the demand.

14. A program storage device, readable by machine, tangibly embodying a program of instructions executable by the machine to cause the machine to perform a method for determining optimal number and sizes of resources to serve multiple demands where each of the demands is assigned to a single resource, wherein resource sizes and demand sizes are limited to power-of-two integers, the larger the resource size the higher its cost but the cost per size unit does not increase with the resource size, and the maximal number of allowed resources is limited to a specified parameter, where resources are subnets in a node of the Internet Protocol (IP) communications network that serve demands for blocks of addresses and demands are either subnets from other nodes in the Internet Protocol (IP) communications network or external demands, the method comprising the steps of:

(a) finding an optimal solution to a relaxed problem wherein all demands are aggregated to a single demand and the constraints that each demand is assigned to a single resource are deleted by determining optimal sets of resources over the entire range of possible demands by determining minimal sets of resources over ranges of possible demands with a number of resources in a set that does not exceed the maximal number of allowed resources, where a set of resources that can serve a range of aggregated demand is minimal if there is no other set with less combined capacity that can serve the demands in that range, and selecting from among the minimal sets the set that is optimal for any specified aggregated demand; and (b) taking the resource sizes of the optimal solution to said relaxed problem and assigning one at a time the largest unassigned demand into the resource whose remaining unused capacity is the smallest among all resources but at least as large as said demand.

* * * * *